United States Patent [19]

Mjöberg

[11] Patent Number: 4,700,852
[45] Date of Patent: Oct. 20, 1987

[54] RECOVERY VEHICLE DEVICE

[75] Inventor: Jan-Olov Mjöberg, Mora, Sweden

[73] Assignee: Mora Hydraulics Aktiebolag, Mora, Sweden

[21] Appl. No.: 733,640

[22] Filed: May 13, 1985

[30] Foreign Application Priority Data

Jul. 17, 1984 [SE] Sweden .............................. 8403746
Oct. 15, 1984 [SE] Sweden .............................. 8405129

[51] Int. Cl.⁴ .............................................. B66C 23/78
[52] U.S. Cl. .................................. 212/189; 212/234; 212/238; 414/563
[58] Field of Search ............... 212/182, 187, 189, 205, 212/223, 224, 232, 238, 245–248, 234; 414/563

[56] References Cited

U.S. PATENT DOCUMENTS

| 3,144,135 | 8/1964 | Brown | 212/224 |
| 3,298,154 | 1/1967 | Behr et al. | 212/224 |
| 3,777,900 | 12/1973 | Brewer | 212/224 |
| 4,417,644 | 11/1983 | Brogard | 212/189 |

FOREIGN PATENT DOCUMENTS

| 0079812 | 5/1983 | European Pat. Off. |
| 1937349 | 2/1971 | Fed. Rep. of Germany |
| 2244657 | 3/1974 | Fed. Rep. of Germany |
| 8200894 | 2/1982 | Sweden |
| 1173987 | 12/1969 | United Kingdom |
| 2061193 | 5/1981 | United Kingdom |
| 2077697 | 12/1981 | United Kingdom |

Primary Examiner—Sherman D. Basinger
Assistant Examiner—Stephen P. Avila
Attorney, Agent, or Firm—Murray and Whisenhunt

[57] ABSTRACT

The invention relates to a device for a recovery vehicle of the type comprising rear, lowerable supporting stifflegs (5) and a crane boom (1) which turns about a horizontal axis (11) and has a boom foot (2) and a folding boom (3) with an extension (4) thereon. According to the invention the crane boom is placed on a turntable or the like on the vehicle. The turntable and consequentially the crane boom can be turned about a vertical axis of rotation. In order that the boom foot, which during transport preferably is arranged between a pair of lowerable rear stifflegs, should be unobstructed by these stifflegs or other obstacles, the crane boom is longitudinally displaceable relative to the turntable, according to a preferred embodiment.

4 Claims, 8 Drawing Figures

RECOVERY VEHICLE DEVICE

FIELD OF THE INVENTION

The invention relates to a device for such recovery vehicles as are provided with lowerable rear supporting stifflegs and a crane boom which turns about a horizontal axis and has a boom foot and a folding boom with an extension.

PRIOR ART

In the art, it is common and conventional to fit a recovery vehicle with extendible supporting stifflegs laterally and to the rear of the vehicle, and, in combination therewith, a crane boom with a winch, said boom pivoting about a horizontal axis and having a boom foot between said rear stifflegs with a folding boom with an extension to which may be fitted a yoke with forks or a grid. One limitation of this known equipment is that the recovery vehicle must be lined up with its tail end toward the wrecked vehicle or other object to be salvaged. Often it is desirable to be able to park the recovery vehicle parallel to a road when recovering vehicles which have ended up off the road. It may for example present a considerable risk or at least be very inconvenient to place a recovery vehicle on a motorway or some other main road perpendicularly or obliquely to the direction of the road. When recovering a vehicle which has driven off a very narrow road it is also often desirable to be able to park the recovery vehicle in the direction of the road during salvage work. Finally, it is a frequent need during military operations to be able to salvage vehicles and other objects without necessarily aligning the recovery vehicle and the object to be recovered. Presently available technology does not acceptably meet these requirements. Granted, for instance in the Swedish Patent Application No. 80055114, which was made official Aug. 14, 1981 (GB 2822579), there is presented the combination of a conventional towing bar and a conventional mobile crane, pivoting about a vertical axis. The mobile crane cannot be utilized for recovery work, however, only for accessory work. The main boom can turn only about a horizontal axis and even if the main boom were placed on some kind of turntable, the turning would be obstructed by the boom foot being locked between the rear wheels of the vehicle and the lowerable rear stifflegs. It is also known, e.g. from Swedish Patent Application No. 8200894-7, which was made official Sept. 10, 1982 to add a towing winch to a conventional mobile crane. The type of recovery equipment listed in the inroductory statement above is missing in this known device, however, and hence the prerequisites for heavier recovery work are not met.

DISCLOSURE OF THE INVENTION

The object of the invention is to solve the problem mentioned above. According to the invnetion, this is accomplished by placing the crane main boom on a turntable or the like on the vehicle and by providing means for turning the turntable and consequently the main boom about a vertical axis of rotation. In order that the main boom be slewable although the boom foot is placed between the rear stifflegs during transport, the main boom may be displaced relative to the turntable in its longitudinal direction.

Further objects, characteristics and aspects of the invention will become apparent from the appended claims and from the following description of a preferred embodiment.

BRIEF DESCRIPTION OF DRAWINGS

In the drawings is depicted a recovery vehicle equipped according to the invention, wherein.

DESCRIPTION OF PREFERRED EMBODIMENT

Figure 1:
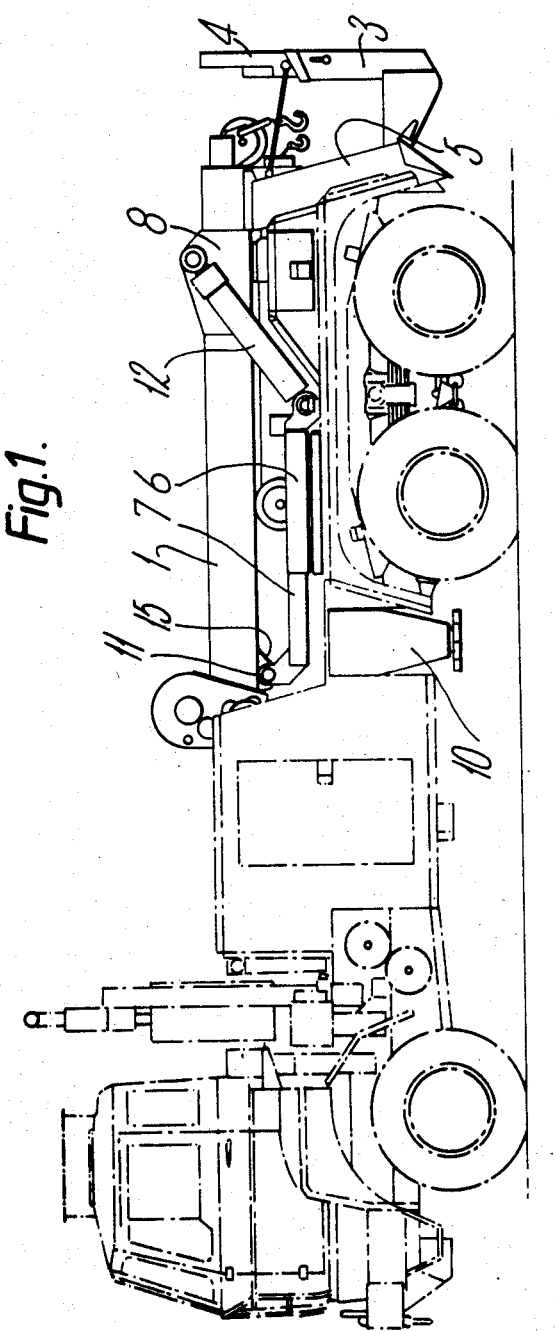
FIG. 1 shows the recovery vehicle in starting position, the equipment in other words being arranged as is the case when the vehicle is on its way toward an assignment.

In the drawings, a main boom has been designated by numeral 1. On the main boom 1 there is a boom foot 2 with a folding boom 3 with an extension 4. The boom foot 2, the folding boom 3 and the extension 4 are in accordance with prior art, the folding boom 3 hence being foldable in relation to the boom foot 2 means of a hydraulic cylinder 13. A pair of rear, lowerable supporting stifflegs has been designated 5, and a pair of lateral stifflegs 10.

Figure 2:
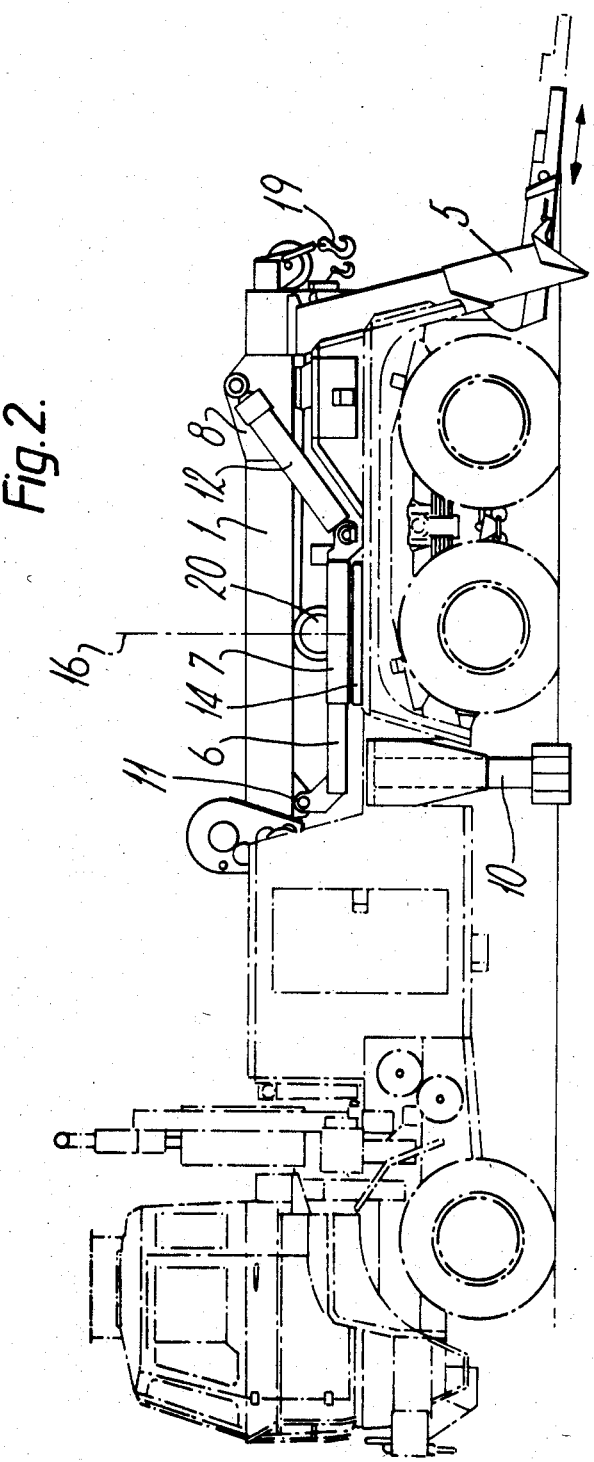
FIG. 2 shows the recovery vehicle ready to start salvaging, the stifflegs and the folding boom being lowered.
Figure 3:
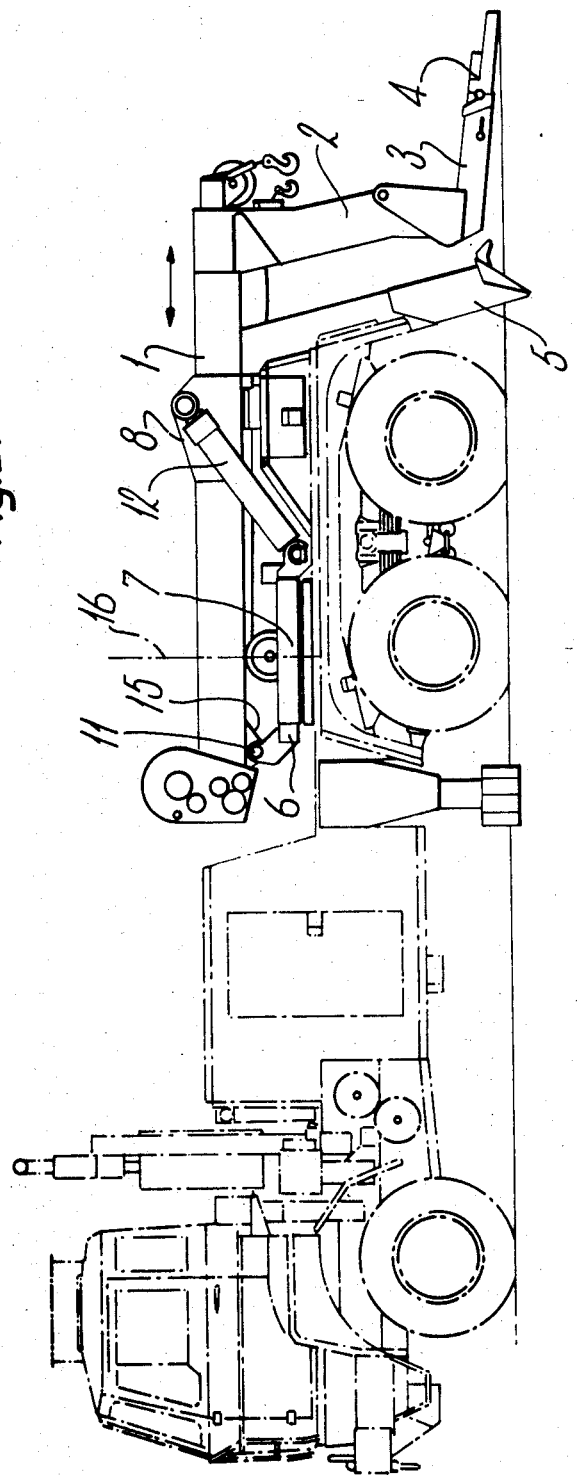
FIG. 3 shows the next step in the operation, the main boom having been brought rearwards to a position from which it is able to turn about a vertical axis of rotation.
Figure 4:
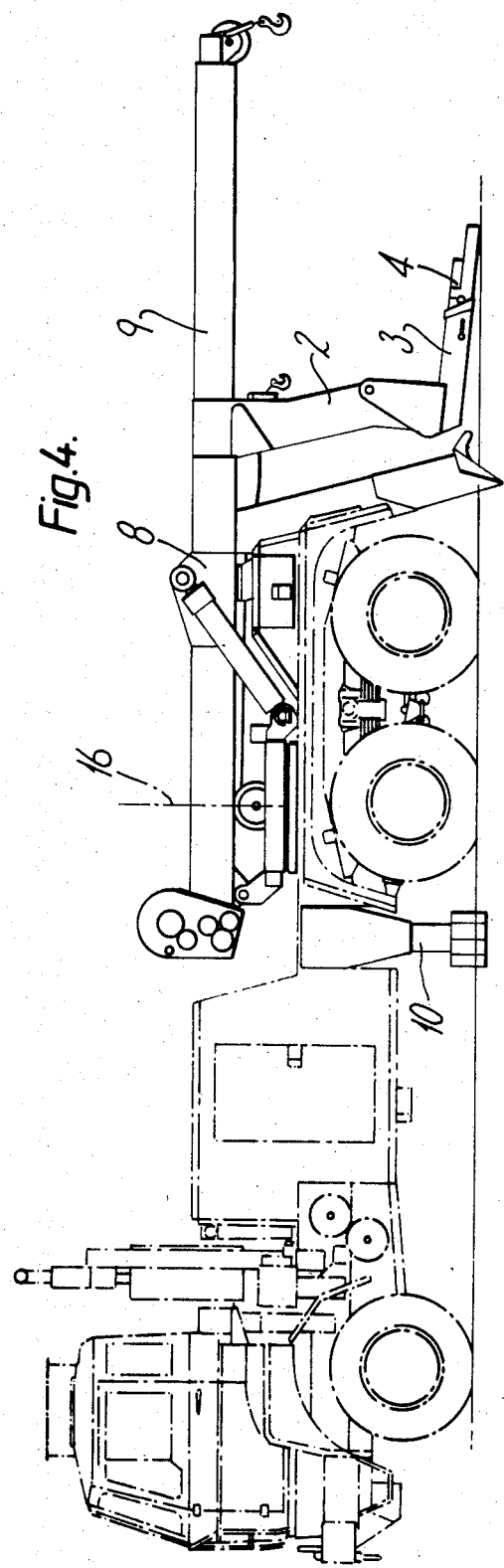
FIG. 4 illustrates the extension of the main boom by means of a telescoping arm.
Figure 5:
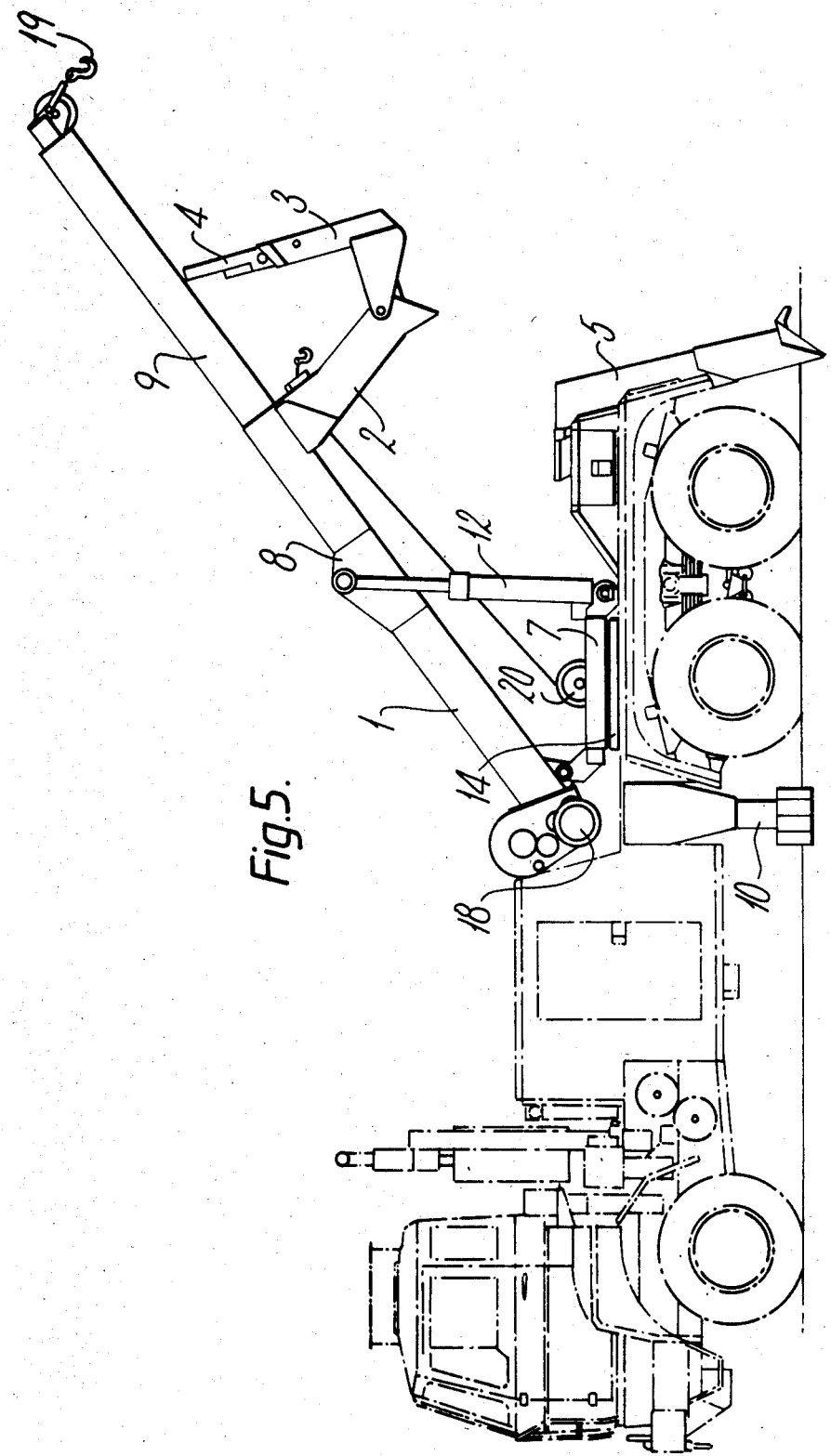
FIG. 5 shows the main boom lifted to illustrate how it may be operated as a mobile crane.

On the recovery vehicle there is a turntable 7, which may be turned about a support 14 by means of a turning device (not shown). This device may be one or several hydraulic cylinders, a hydraulic motor, or an electric motor, according to prior art. Between the turntable 7 and forward attachments 15 on the main boom 1 there is a first pair of hydraulic cylinders 6. In the attachments 15 also the horizontal pivot axis 11 of the main boom 1 are provided. Between the opposite, rear, side of the turntable and cylinder attachments 8 on the main boom 1 there is a second pair of hydraulic cylinders 12. The main boom is able to slide relative to the attachments 8. This sliding may be accomplished by means of the first hydraulic cylinders 6. This is made use of in order to displace the main boom 1 and hence the boom foot 2 thereon with the folding boom 3 and extension 4 from its forward transport position so that boom foot will not engage the rear stifflegs 5 (see FIGS. 1 and 2). In the rear position, the main boom 1 may be turned about a vertical axis 16 without being obstructed by the rear stifflegs 5. Prior to transport, the main boom 1 and consequently the salvaged vehicle is moved forward by means of the hydraulic cylinders 6, so that weight is transferred to the front axle of the recovery vehicle, thus dividing the load weight more favourably between the front and rear wheels. When the main boom 1 is raised or lowered about its horizontal pivot axis 11 by means of the second hydraulic cylinders 12 it also slides relative to the cylinder attachments 8.

Figure 6:
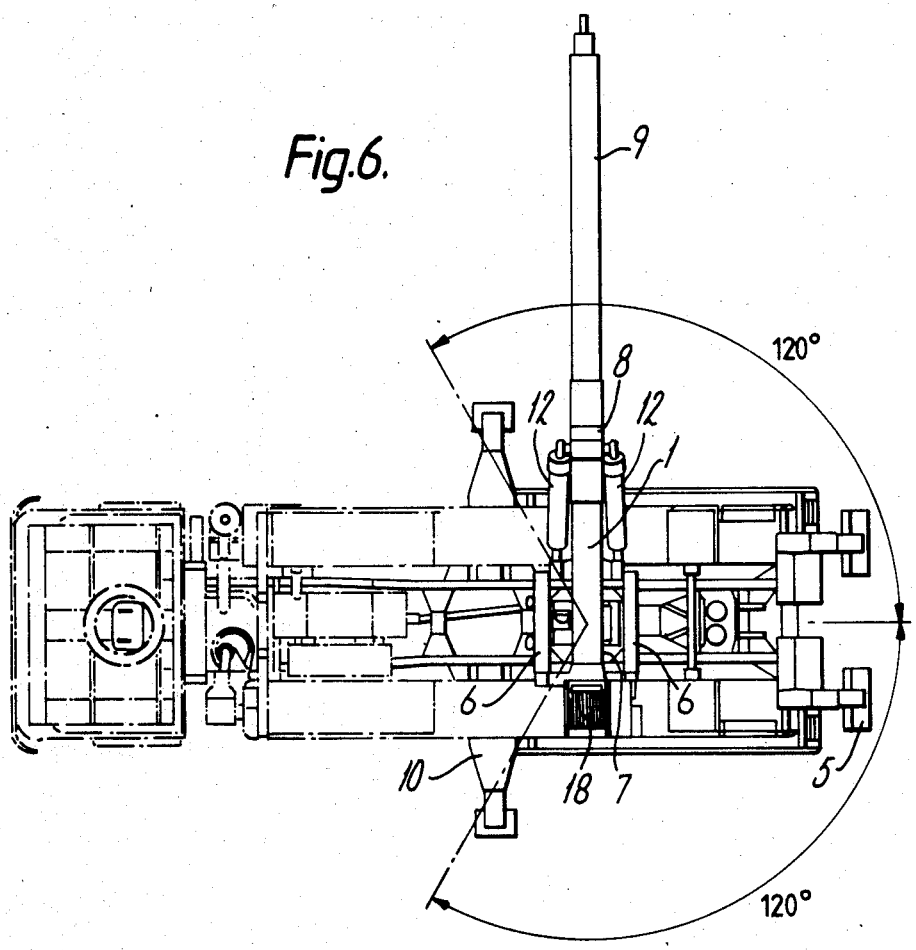
FIG. 6 illustrates by a plan view how the main boom may turn about the vertical axis of rotation.

The main boom 1 may be slewed ±120° from its transport position, as is illustrated in FIG. 6.

At the front of the main boom 1 there is a main winch 18 with a tow hook 19 at the extreme end of the telescoping arm 9. Further, there is an auxiliary winch 20 on the turntable 7. The weight of the main boom 1 and the salvaged vehicle are transferred via the turning axis 15 and the rear hydraulic cylinders 12 to the turntable and hence via the lower support 14 to the recovery vehicle.

Figure 7:
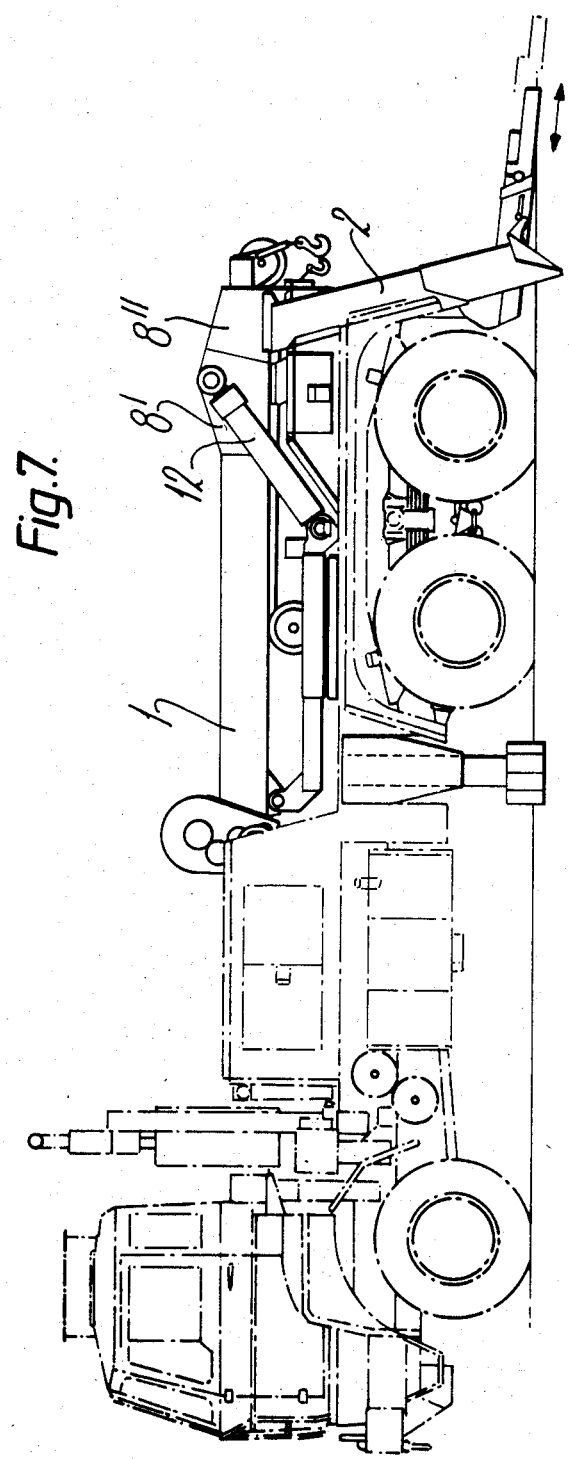
FIGS. 7 and 8 illustrate a slightly modified embodiment.
Figure 8:
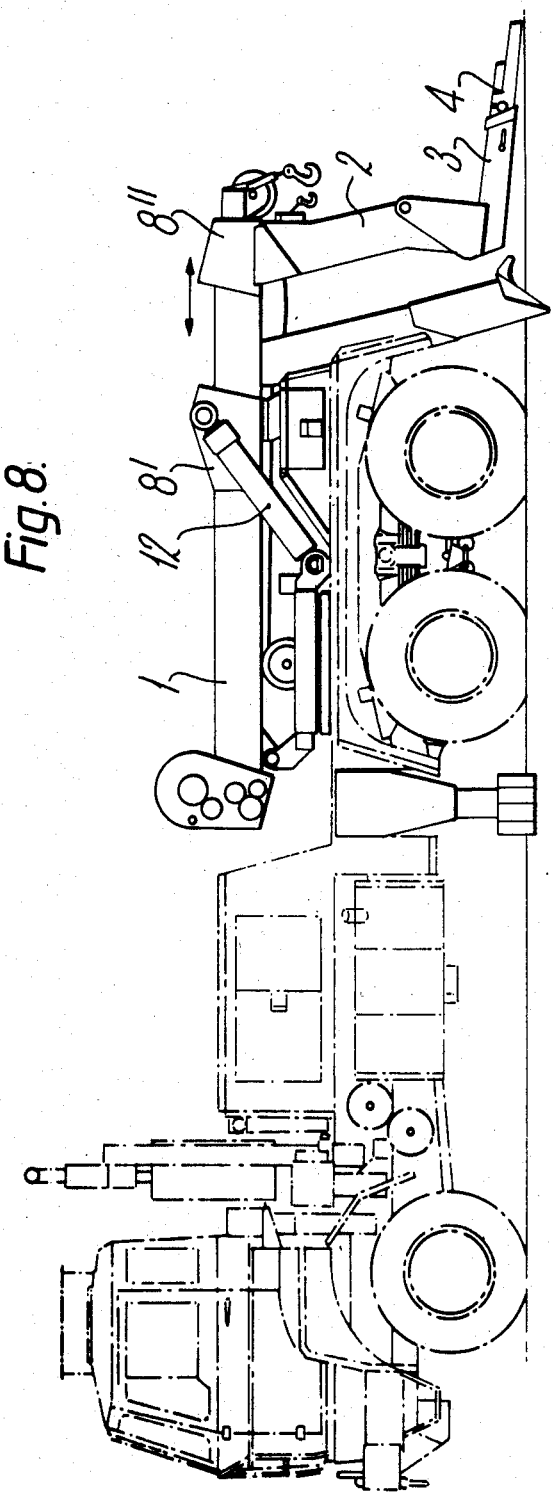

According to the embodiment illustrated in FIGS. 7 and 8, the main boom 1 has been provided with two sliding sleeves 8' and 8" instead of the single sleeve 8 of the previously described embodiment. The attachments for the cylinders 12 are mounted on the forward one 8' of these sleeves, the rear sleeve 8" holding the boom foot 2 with the folding boom 3 and the extension 4. Normally, the two sleeves 8' and 8" are flush against each other, but they may be separated and locked in position independently. The sliding sleeves may be locked hydraulically or by means of locking pins. This arrangement provides more working space underneath the main boom during crane work.

I claim:

1. Recovery vehicle comprising a vehicle, lowerable supporting stiffleg means located proximate the rear of said vehicle for supporting said vehicle during recovery operations, a main boom, turntable means, said main boom mounted on said turntable means for pivotable movement about a horizontal axis, said turntable means being rotatable for turning the main boom about a vertical axis of rotation, a boom foot mounted on said main boom, a folding boom mounted on said boom foot and including an extendable extension thereof, said main boom having a longitudinal direction thereof and being movable relative to the turntable means in the longitudinal direction of the boom, hydraulic means being connected between said turntable means and said main boom for displacement of said main boom relative to the turntable means in the longitudinal direction of the main boom, said device further including attachment means mounted on said mean boom, and second hydraulic means connected between said turntable means and said attachment means for pivotably moving said main boom about said horizontal axis, and wherein said main boom is displaceable relative to said attachment means between a forward transport position, wherein said main boom is lowered to a substantially horizontal transport position wherein the boom foot with folding boom and extension thereon are generally located between said stiffleg means, and a rear working position, wherein the boom foot with folding boom and extension thereon are unobstructed by said stiffleg means, even when said main boom is lowered into a substantially horizontal position, so that said main boom is free to turn about the vertical axis of rotation.

2. Device according to claim 1, wherein the main boom includes a telescopic arm means for extending said main boom past the boom foot.

3. Recovery vehicle comprising a vehicle, lowerable supporting stiffleg means located proximate the rear of said vehicle for supporting said vehicle during recovery operations, a main boom, turntable means, said main boom mounted on said turntable means for pivotable movement about a horizontal axis, said turntable means being rotatable for turning the main boom about a vertical axis of rotation, a boom foot mounted on said main boom, a folding boom mounted on said boom foot and including an extendable extension thereof, and wherein a first and a second attachment means are associated with said main boom, with the first attachment means being a sliding sleeve to which second hydraulic means is attached, and the second attachment means being a second sliding sleeve means to which the boom foot is attached, said first and second sliding means being capable of being moved together to form a unit and of being separatable and lockable independent of each other.

4. Recovery vehicle comprising a vehicle, lowerable supporting stiffleg means located proximate the rear of said vehicle for supporting said vehicle during recovery operations, a main boom, turntable means, said main boom mounted on said turntable means for pivotable movement about a horizontal axis, said turntable means being rotatable for turning the main boom about a vertical axis of rotation, a boom foot mounted on said main boom, a folding boom mounted on said boom foot and including an extendable extension thereof, attachment means mounted on said main boom, said main boom being displaceable relative to said attachment means between a forward transport position, wherein said main boom is lowered to a substantially horizontal transport position wherein the boom foot with folding boom and extension thereon are generally located between said stiffleg means, and a rear working position, wherein the boom foot with folding boom and extension thereon are unobstructed by said stiffleg means, even when said main boom is lowered into a substantially horizontal position, so that said main boom is free to turn about said vertical axis of rotation.

* * * * *